INVENTORS
ARTHUR W. LO &
HEWITT D. CRANE
BY Morris B. Rabkin
ATTORNEY

INVENTORS
ARTHUR W. LO &
HEWITT D. CRANE
BY Morris A. [signature]
ATTORNEY

Dec. 19, 1961 A. W. LO ETAL 3,014,204

MAGNETIC CIRCUITS

Filed Dec. 11, 1956 4 Sheets-Sheet 3

INVENTORS
ARTHUR W. LO &
HEWITT D. CRANE
BY Morris Rabkin
ATTORNEY

MAGNETIC CIRCUITS

Filed Dec. 11, 1956

4 Sheets-Sheet 4

INVENTOR.
ARTHUR W. LO &
HEWITT D. CRANE

BY Morris B. Pelton

ATTORNEY

United States Patent Office 3,014,204

Patented Dec. 19, 1961

3,014,204
MAGNETIC CIRCUITS

Arthur W. Lo, Fords, N.J., and Hewitt D. Crane, Palo Alto, Calif., assignors to Radio Corporation of America, a corporation of Delaware Filed Dec. 11, 1956, Ser. No. 627,678
24 Claims. (Cl. 340—174)

This invention relates to magnetic circuits, and particularly to magnetic circuits useful in performing logic operations.

Circuits using magnetic cores have been used for performing such basic logic operations as those of "negation", "or", "and", and "exclusive-or". These circuits are used as component parts of larger systems for performing more complex functions. Prior magnetic logical circuits use unilateral conducting devices, or devices having non-linear characteristics, such as diodes, in the loops coupling the various cores. The diodes are used for isolation purposes and for blocking undesired transfer of signals between two cores. In such circuits, the reliability is often limited by that of the diode elements since the magnetic cores usually have an indefinite life. Further, undesired couplings may exist between the various input and output circuits of the prior logic circuits. Such undesired coupling, for example, may reduce both the speed of operation and the flexibility of a circuit in performing any given logic operation.

It is an object of the present invention to provide improved magnetic circuits for performing logic operations.

Another object of the present invention is to provide improved magnetic circuits that use only magnetic elements in carrying out logic operations.

A further object of the invention is to provide improved magnetic logic circuits wherein substantially no undesired coupling exists between the various input and output circuits.

Another object of the present invention is to provide improved logic circuits that can be operated at faster speeds than certain of the prior logic circuits.

The present invention uses transfluxor cores such as are described, for example, in an article by J. A. Rajchman and A. W. Lo, in the March 1956 Proceedings of the I.R.E., entitled "The Transfluxor," pp. 321–332. Each circuit of the present invention includes one or more pairs of transfluxor cores for controlling the condition of a third transfluxor core. In operation, when the cores of a controlling pair are set to the same condition, a drive current applied to the circuit does not change the condition of the third core. When the cores of the controlling pair are set to different conditions, the drive current does change the condition of the third core. Separate setting circuits may be used for the pair of cores. Any source of one kind, for example a setting source, is substantially decoupled from a source of another kind, for example a drive source, throughout the entire operation.

Aspects of the invention include several different modes of operating the various logic circuits. One mode includes a bipolarity drive signal, and another mode includes a drive signal of only one phase.

Figure 1:
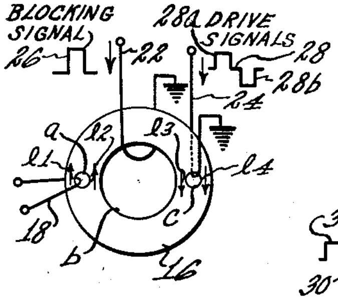
FIGS. 1, 2 and 3 are each a schematic diagram of a transfluxor core suitable for use in circuits of the present invention, and these figures are used in explaining the present invention.

The three-aperture core 16 of FIG. 1 is similar to the three-aperture transfluxor core shown in FIG. 17 of the aforementioned article. The three apertures *a*, *b* and *c* form four distinct legs $l_1$, $l_2$, $l_3$ and $l_4$. Preferably, the middle aperture *b* is of greater diameter than that of either of the apertures *a* and *c*, which may be of equal diameter. The three apertures *a*, *b* and *c* are located in the core material so that the minimum cross-sectional areas of the legs $l_1$ through $l_4$ are all equal to each other. Conveniently, the three apertures may be centered on a straight line, as shown. However, in practice, proper operation can be achieved if the two smaller apertures *a* and *c* are spaced apart so that each has its own separate flux path, as will be more fully apparent hereinafter. Aperture *b* is called the blocking aperture; aperture *a* is called the setting aperture, and aperture *c* is called the output aperture. A setting winding 18 links the core 16 through the setting aperture *a*; a blocking winding 22 links the core 16 through the blocking aperture *b*, and a drive winding 24 links the core 16 through the output aperture S.

The core 16 of FIG. 1 is placed in its blocked condition by applying a positive-polarity blocking pulse 26 to the blocking winding 22. Each blocking pulse 26 is of sufficient amplitude to orient the flux in each of the legs $l_1$ through $l_4$ in the clockwise sense with reference to the blocking aperture *b*. Hereinafter, all the senses of flux orientation are taken with respect to the blocking aperture *b*. The flux orientation in the transfluxor core 16, after any applied pulse, can be determined by using the "right-hand rule." The arrows in the legs $l_1$ through $l_4$ indicate the flux orientation after a blocking pulse 26. The arrow adjacent the blocking winding 22 is a polarity arrow used to indicate the direction of positive, conventional current flow. Each of the other arrows adjacent a winding also is used to indicate the direction of positive, conventional current flow.

The first mode of operation employs an alternating-polarity drive signal 28 which has a positive phase 28*a* and a negative phase 28*b* of equal amplitude. The two phases of the alternating signal 28 may have different amplitudes and durations, if desired. In the blocked condition, a drive signal 28 applied to the drive winding 24, does not produce any substantial flux change in the core 16. No flux change is produced because the one or the other of the legs $l_3$ and $l_4$ already is saturated with flux in the sense that the positive and the negative phases 28*a* and 28*b* of the drive signal 28 tend to increase flux. This operation of a transfluxor core 16 is described in detail in the aforementioned article. The amplitude of the positive phase 28*a* of the drive signal is made insufficient to produce a flux change in the longer path about both the apertures *b* and *c*, which path includes the legs $l_2$ and $l_4$. This latter flux change is undesired in the first mode of operation because it "spuriously unblocks" the transfluxor core 16.

Figure 2:
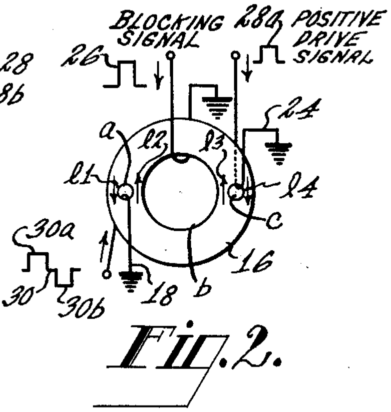
Figure 3:
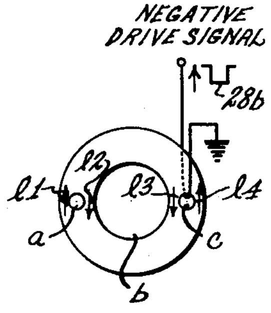

The transfluxor core 16 is placed in its set condition by applying an alternating polarity setting signal 30 to the setting winding 18. The two phases 30$a$ and 30$b$ of the setting signal 30 may be of the same or of different amplitudes and duration S. The first positive phase 30$a$ reverses the flux in the longer path about both the apertures $a$ and $b$, which path includes the legs $l_1$ and $l_3$, from the clockwise to the counterclockwise sense. The arrows in the legs $l_1$ through $l_4$ of the core 16 of FIG. 2 indicate the flux orientation after the termination of the positive phase 30$a$ of the setting pulse 30. The negative phase 30$b$ of the setting signal 30 reverses the flux in the smaller path about the setting aperture $a$, which path includes the legs $l_1$ and $l_2$. The flux in the leg $l_1$ is changed back to the initial clockwise sense and the flux in the leg $l_2$ is changed to the counterclockwise sense. The arrows in the legs $l_1$ and $l_2$ of the core 16 of FIG. 3 indicate the flux orientation after the negative phase 30$b$ of the setting signal 30. The amplitudes of both phases 30$a$ and 30$b$ of the setting signal 30 may be as large as desired, as described in the abovementioned article, without any danger of "oversetting." The positive phase 30$a$ of the setting signal 30 can produce a flux reversal only in the legs $l_1$ and $l_3$ because the leg $l_3$ absorbs all the flux change in the leg $l_4$ more distant from the setting aperture $a$. Similarly, the negative phase 30$b$ of the setting signal 30 can produce a flux reversal only in the path including the legs $l_1$ and $l_2$ because the leg $l_1$ absorbs all the flux change in the leg $l_2$ before any flux reversal can occur in the leg $l_3$ more distant from the setting aperture $a$. Note that the setting signal 30 does not induce any output signal in the drive winding 24 because substantially no flux reversal is produced in the leg $l_4$ by either of its phases. Thus, the setting winding 18 and the drive winding 24 are substantially decoupled from each other during the setting operation.

In the set condition, the positive phase 28$a$ of a drive signal 28 now reverses the flux in the legs $l_3$ and $l_4$ from the respective counterclockwise and clockwise senses to the respective opposite senses. The arrows in FIG. 3 indicate the flux orientations in the legs $l_3$ and $l_4$ after the positive phase 28$a$ of the drive signal 28 is terminated. The succeeding negative phase 28$b$ of the drive signal 28 then reverses the flux in the legs $l_3$ and $l_4$ back to their respective counterclockwise and clockwise senses. The senses of flux in the legs $l_3$ and $l_4$, after the negative phase 28$b$ of the drive signal, are indicated by the arrows in FIG. 2.

Note that the drive signal 28 produces flux reversals only in the legs $l_3$ and $l_4$. Thus, the setting winding 18 and the driving winding 24 are substantially decoupled from each other during the drive operation.

The transfluxor core 16 can be returned to its blocked condition by applying a new blocking pulse 26 to the blocking winding 22. This new blocking pulse reverses the flux in the legs $l_2$ and $l_3$ from the counterclockwise sense to the clockwise sense. Accordingly, during each subsequent blocking operation, only the flux in the legs $l_2$ and $l_3$ is reversed and substantially no voltage is produced in either the setting winding 18 or in the drive winding 24.

Figure 4:
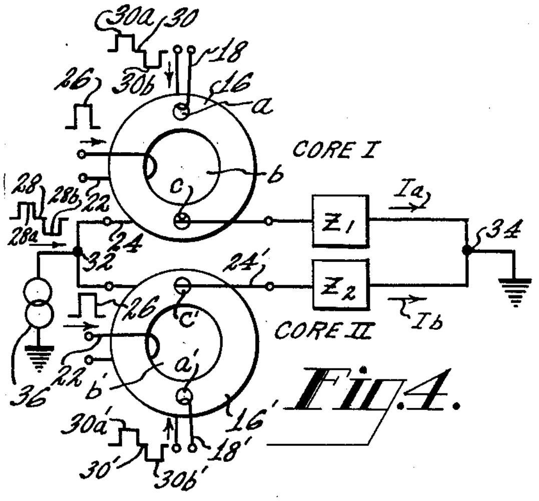
FIG. 4 is a schematic diagram of a circuit having a pair of transfluxor cores, and used in further explaining the present invention.

Consider, now, the circuit of FIG. 4 which includes a pair of similar transfluxors with cores 16. The upper transfluxor core 16 is designated as the core I, and the lower transfluxor core 16 is designated as the core II. Similar windings of the cores I and II are designated by similar reference characters with the addition of a prime to the reference characters of the core II. The drive winding 24 of the core I is connected in series with an impedance element $Z_1$ across two junction points 32 and 34. The drive winding 24' of the core II is connected in series with another impedance element $Z_2$ across the same two junction points 32 and 34. The two impedance elements $Z_1$ and $Z_2$ may be similar to each other and may represent, for example, windings respectively linked to a third transfluxor core, as described hereinafter. The second junction point 34 is connected to a common reference potential indicated in the drawing by the conventional ground symbol. A drive source 36, for furnishing the symmetrical drive signals 28, is connected between the first junction 32 and ground. The arrangement of the circuit of FIG. 4 thus provides two parallel current paths between the drive source 36 and the common ground.

The total current from the source 36, due to the drive signal 28 applied to the circuit of FIG. 4, divides into two currents I$a$ and I$b$. The relative amounts of the currents I$a$ and I$b$ depend upon the response conditions of the two cores. If both cores I and II are in either their blocked or their set condition, the branch currents I$a$ and I$b$ are equal for equal impedance elements $Z_1$ and $Z_2$. If either of the cores I and II is set and the other is blocked, the branch currents I$a$ and I$b$ are unequal. Thus, if core I is set and core II is blocked, then the upper branch current I$a$ is less than the lower branch current I$b$, and vice versa when the core II is set and the core I is blocked.

Figure 5:
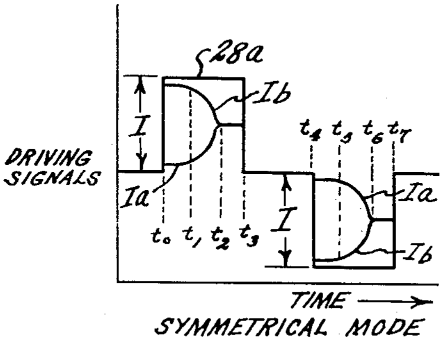
FIG. 5 is a graph of waveforms useful in explaining one mode of operation of the circuits of the present invention.

The waveforms of FIG. 5 illustrates the division of the branch currents I$a$ and I$b$ for the core I set and the core II blocked. Between the time $t_0$, when the positive phase 28$a$ of the drive signal is initiated, and a later time $t_1$, most of the drive current flows in the lower branch while the flux in the core I is being reversed. After the time $t_1$, the flux in the core I is almost completely reversed, and the branch currents I$b$ and I$a$ respectively start to decrease and increase proportionately. At all times, the sum of the branch currents I$a$ and I$b$ is equal to the drive current I. Between the time $t_2$, after the flux in the core I is substantially completely reversed and the time $t_3$ when the positive phase 28$a$ of the drive signal is terminated, the two branch currents I$a$ and I$b$ are substantially equal. Similarly, between the time $t_4$, when the negative phase 28$b$ of the drive signal is initiated, and a later time $t_5$, most of the drive current flows through the lower branch of the circuit of FIG. 4 while the flux in the core I is changing; then after the time $t_5$, the flux in the core I is almost completely reversed, the branch currents respectively start to increase and decrease. Then between the time $t_6$, after the flux in the core I is substantially completely reversed, and the time $t_7$, when the negative phase 28$b$ of the drive signal is terminated, the branch currents I$a$ and I$b$ are substantially equal. In practice, the positive phase 28$a$ and the negative phase 28$b$ of the drive signal are each terminated before the flux in the set transfluxor core 16 is completely reversed, say, at the times $t_1$ and $t_5$, respectively. The ratio between the two branch currents I$a$ and I$b$, when the cores are in different response conditions, may be termed the "discrimination." The impedance elements $Z_1$ and $Z_2$, connected in the branch circuits, tend to reduce the discrimination. In practice, an impedance element is made sufficiently small such that it has a relatively small influence on the way in which the branch currents divide. For larger impedance elements, larger transfluxor cores can be used.

Figure 6:
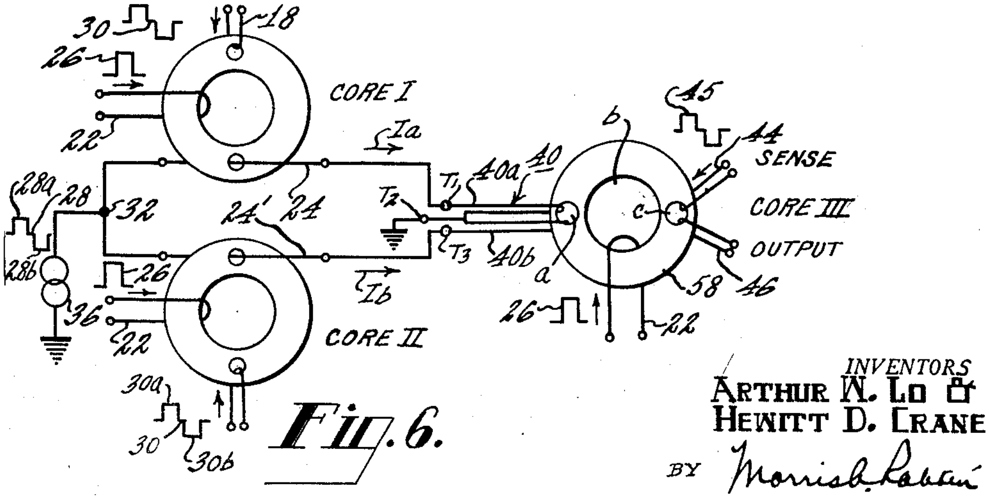
FIG. 6 is a schematic diagram of a circuit according to the invention, including three transfluxor cores.

The two load impedances $Z_1$ and $Z_2$ may represent the respective impedances of the halves of a center-tapped setting winding 40 of a third, three-aperture transfluxor core 58 designated as the core III in FIG. 6; that is, the impedance element $Z_1$ represents the impedance of one portion 40$a$ of the setting winding 40 between one end terminal $T_1$ and the center terminal $T_2$, and the impedance element $Z_2$ represents the impedance of the other equal portion 40$b$ of the setting winding 40 between the center terminal $T_2$ and the other end terminal $T_3$. Note that the branch current I$a$ flowing in the portion 40$a$ of the setting winding 40 generates a magnetizing force of one polarity, while the branch current I$b$ flowing in the portion 40$b$ of the setting winding 40 generates an opposite-polarity magnetizing force. Only the magnetizing force produced by the branch current I$b$ is in the proper direction to change the core III from its blocked to its set condition. A sensing winding 44 for receiving alternating sensing signals 45 is linked to the core III through the output aperture $c$ thereof. The alternating sensing signals 45 may be supplied from any suitable source, not shown. An output winding 46 also is linked through the output aperture $c$ of the core III. A drive signal 28 changes the core III to its set condition only when the cores I and II are in different response conditions, one set and the other blocked. When the cores I and II are both blocked, or both set, the branch currents I$a$ and I$b$ are substantially equal to each other and produce substantially no flux change in the core III. No flux change is produced because the magnetizing force generated by the current I$b$ is cancelled by the opposite-polarity and equal magnetizing force generated by the current I$a$.

Initially, each of the cores I, II and III is in its blocked condition, as described in connection with FIG. 1. Assume, now, that the core I is placed in its set condition, as by applying a setting signal 30 to its setting winding 18. Now, when a drive signal 28 is applied, the positive phase 28$a$ divides into two unequal branch currents, with the amount of current I$b$ exceeding the amount of current I$a$, and the net magnetizing force produces a flux change in the legs $l_1$ and $l_3$ of the core III to place core III in its set condition, as described above in connection with FIG. 2. The negative phase 28$b$ of the drive signal also divides into two unequal portions, with the amount of current I$b$ exceeding the amount of current I$a$, and the net magnetizing force produces a flux reversal in the legs $l_1$ and $l_2$ of the core III, thereby decoupling the setting winding 40 from the other windings linked to the core III.

The positive phase 28$a$ of the drive signal 28 is limited in amplitude, so that the core II does not become spuriously unblocked. The amplitude of the negative phase 28$b$ of the drive signal may be as large as desired. However, any value of net magnetizing force equal to, or greater than, that required to produce a flux reversal along the legs $l_1$ and $l_3$ of the core III is permissible.

In the following logic circuits the two conditions, "set" and "blocked," of a transfluxor core respectively may represent the two binary digits "1" and "0." Also, in each of the following logic circuits, one of the transfluxor cores of any circuit may be used as a dummy core; that is, a dummy core initially is established in one of its two conditions and thereafter remains in the established condition. The other of the transfluxor cores is used as an input core; that is, the condition of an input core is established in accordance with an input signal. For example, when an input signal is received, the input core is changed to its set condition and, when an input signal is not received, the input core remains in its blocked condition.

The logic circuit of FIG. 6 is used to perform the "negation" function as follows: A "negation" circuit is a logic circuit which furnishes an output when, and only when, an input signal is absent. No output is furnished when the input signal is present. In the negation circuit of FIG. 6, the transfluxor core I may be the dummy core, the core II may be the input core, and the core III is the output core. The dummy core I is initially established in its set condition as by applying a setting signal 30 to its setting winding 18. The setting winding 18 then may be removed from the core I, if desired. Each operating cycle may be first applying a blocking signal 26 to the blocking windings 22 of the cores II and III, then applying, or not applying, a setting signal 30 to the setting winding 18 of the core II, and then applying any desired number of sensing signals 45 to the sensing winding 44 of the core III, etc. Upon each occurrence of an input signal, a setting signal 30 is applied to the setting winding 18 of the input core II and changes the input core II to its set condition. A subsequent drive signal 28 then divides into two equal branch currents I$a$ and I$b$ and, accordingly, the output core III remains in its initially blocked condition. A sensing signal 45, applied to the sensing winding 44 of the output core III, does not produce any output signal in the output winding 46 of the core III because substantially no flux change is produced about the output aperture $c$ of the output core III. As many sensing signals 45 as desired may be applied without producing any output signal in the output winding 46. The output winding 46 may be connected to any suitable utilization device (not shown) responsive to output signals produced in the output winding 46. The core II is returned to its blocked condition by the next blocking signal 26 applied to its blocking winding 22.

However, if the core II is not changed to its set condition, due to the absence of a setting signal 30, then the following drive signal 28 divides into two unequal branch currents. The larger branch current I$b$ changes the output core III to its set condition. Accordingly, a succeeding sensing signal 45 applied to the sensing winding 44 now produces an output signal in the output winding 46. After any desired number of outputs are obtained, both the input core II and the output core III are returned to their blocked conditions by the succeeding blocking signals 26 applied to their respective blocking windings 22.

Figures 7, 8:
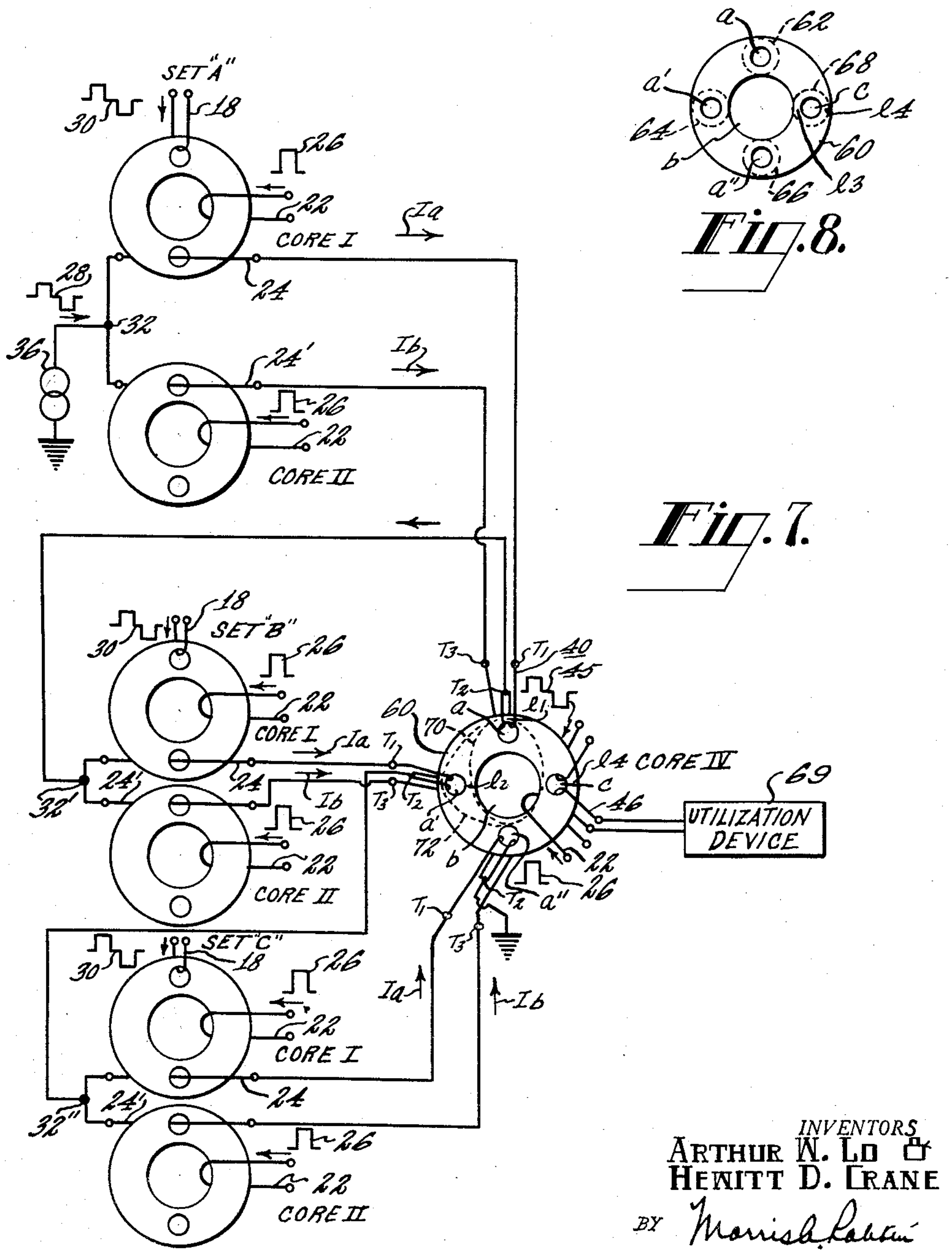
FIG. 7 is a schematic diagram of an "or" circuit according to the invention.
FIG. 8 is a schematic diagram of a transfluxor core that may be used in the "or" circuit of FIG. 7.

One embodiment of a circuit, according to the invention, for performing an "inclusive or" operation is shown in FIG. 7. An "inclusive or" circuit is a logic circuit which furnishes an output in response to one or more input signals. The core 60 of FIG. 7 is used as the output and is designated as the core IV. The output core IV has, for example, three separate setting apertures $a$, $a'$ and $a''$. Each of the three setting apertures is linked by a different one of the three center-tapped setting windings 40, 40' and 40''. Any one of the setting apertures $a$, $a'$ and $a''$ of the output core IV is used in a manner similar to that of the setting aperture $a$ of the output core III of FIG. 6. The angular spacing between any two of the setting apertures $a$, $a'$ and $a''$, and the output aperture $c$ of the output core IV, is made sufficiently great to provide a separate flux path about each smaller aperture. The three separate flux paths about the setting apertures $a$, $a'$ and $a''$, respectively, are indicated by the dotted lines 62, 64 and 66 of the core IV of FIG. 8. The separate flux path about the output aperture $c$ of the core IV is indicated by the dotted line 68 of FIG. 8. For example, a 90° angular spacing between adjacent apertures, as shown, is suitable for providing the desired separate flux paths. Note, however, that any longer flux path about both the blocking aperture $b$ and any one of the setting apertures $a$, $a'$ and $a''$ of the output core IV includes the inner leg 13 between its blocking aperture $b$ and its output aperture $c$. Thus, a current of proper polarity flowing through any one of the setting apertures $a$, $a'$ and $a''$ of the output core IV produces a flux reversal in its inner leg $l_3$, thereby changing the output core IV to its set condition.

The three setting circuits of FIG. 7, like those of FIG. 6, are connected in series with each other in the circuit of FIG. 7 by connecting the center terminal $T_2$ of the setting winding 40 of the first setting circuit to the first common terminal 32 of the second circuit, and by connecting the center terminal $T_2$ of the setting winding 40' of the second circuit to the common terminal 32' of the third circuit. The center terminal $T_2$ of the setting winding 40'' of the third circuit is connected to ground. The drive source 36 is connected between the common terminal 32 of the first circuit and ground. The core II of each setting circuit is used as a dummy core, and the core I of each setting circuit is used as an input core. The three setting circuits are sufficient to control the response of the output core IV in accordance with three inputs designated "A," "B" and "C."

In operation, each of the dummy cores II of the three setting circuits is initially established in its blocked condition, as by applying a blocking signal 26 to its blocking winding 22. Each of the input cores I of the three setting circuits, and the output core IV, are initially in their blocked conditions as by applying blocking signals 26 to their respective blocking windings 22. The schedule of operation may be: First, applying, or not applying, one or more of the three separate setting signals 30 corresponding to the presence of one or more of the three sepaarte inputs A, B and C, respectively, to the three setting circuits. The setting signals may be applied simultaneously or sequentially in any order. Second, applying a drive signal 28 to all the setting circuits. Third, applying any desired number of sensing signal 45 to the sensing winding 44 of the output core IV and, finally, applying a new blocking signal 26 to the blocking windings 22 of the three input cores I and to the blocking winding 22 of the output core III.

Assume, now, that the input core I of the first setting circuit is changed to its set condition by a setting signal 30 applied to its setting winding 18. Also assume that the other two input cores I are in their initially blocked condition. When the following drive signal 28 is applied, it divides into two unequal portions in the two branches of the first setting circuit. The portion I*b* of the drive signal is larger than the portion I*a*. The magnetizing force generated by the larger portion I*b* changes the output core IV from its blocked to its set condition. The unequal two portions I*a* and I*b* of the drive combine at the terminal $T_2$ of the first setting winding 40, and the drive signal then divides equally in the two branch circuits of the second setting circuit. The two equal portions of the drive signal 28 combine at the terminal $T_2$ of the second setting winding 40′, and the drive signal 28 again divides equally in the two branches of the third setting circuit. The two equal portions then combine at the terminal $T_2$ of the third setting winding 40″ and return to the drive source 36. The path in the output core IV along which a flux reversal is produced by the larger portion I*b* by positive phase 28*a*, of the drive signal, is indicated in FIG. 7 by the dotted line 70. This flux path includes the outside leg $l_1$ of the first setting aperture *a*, the inside legs $l_2$ of the other setting apertures *a*′ and *a*″, and the inside leg $l_3$ of the output aperture *c*. The following negative phase 28*b* of the drive signal 28 produces a flux reversal in the path 62 (FIG. 8) immediately around the first setting aperture *a* of the output core IV. The negative phase 28*b* of the drive current 18 does not produce any flux reversals about the second and third setting apertures *a*′ and *a*″ because insufficient magnetizing force is applied along the paths 64 and 66 (FIG. 8) immediately around these apertures. A subsequent sensing signal 45 then produces a flux reversal about the output aperture *c* of the output core IV, thereby producing output signals in the output winding 46. The output signals produced in the output winding 46 are applied to a utilization device 69 which, for example, may be another of the logic circuits according to the invention. The logic circuit then may be returned to its initial blocked condition by applying a blocking signal 26 to the blocking windings 22 of the input cores I and the output core IV.

Assume, now, that both the input cores I of the upper two setting circuits are changed to their set condition representing the presence of the inputs A and B; and assume that the input core I of the third setting circuit remains in its blocked condition representing the absence of the input C. In such case, the succeeding drive signal 28 divides into two unequal portions in both the first and the second setting circuits with the portion I*b* being larger than the portion I*a*. The drive signal divides into two equal portions in the third setting circuit. These larger portions I*b* of the drive signal cause a flux reversal in the outside legs $l_1$ of the first and second setting apertures *a* and *a*′, in the inside legs $l_2$ and $l_3$ of the third setting aperture *a*″, and the output aperture *c*, respectively. The larger portions I*b* of the drive signal flowing in the second setting circuit tends to hold the flux in the inside leg $l_2$ of of the second setting aperture *a*′ in its initial clockwise sense. The flux path along which a flux reversal is produced in the output core IV by the positive phase 28*a* of the drive signal 28 is indicated in FIG. 7 by the dotted line 72. The following negative phase 28*b* of the drive signal 28 reverses the flux in the paths 62 and 64 (FIG. 8) immediately around the first and second setting apertures *a* and *a*′.

In similar manner, if all three setting cores I are changed to their respective set conditions, the positive phase 28*a* of the drive signal 28 produces a flux reversal in the outside legs $l_1$ of all three setting apertures *a*, *a*′ and *a*″ of the output core IV and in the inside leg $l_3$ of its output aperture *c*. The negative phase 28*b* of the drive signal 28 then reverses the flux in the paths 62, 64 and 66 (FIG. 8) immediately around the respective setting apertures *a*, *a*′ and *a*″. Accordingly, later applied blocking signals 26 applied to the respective blocking windings 22 produce flux reversals only in the paths immediately around the respective blocking apertures *b* in returning any of the set cores to its blocked condition. This means that substantially no signals are produced in any of the setting circuits when returning the cores to their respective blocked conditions.

Figure 9:
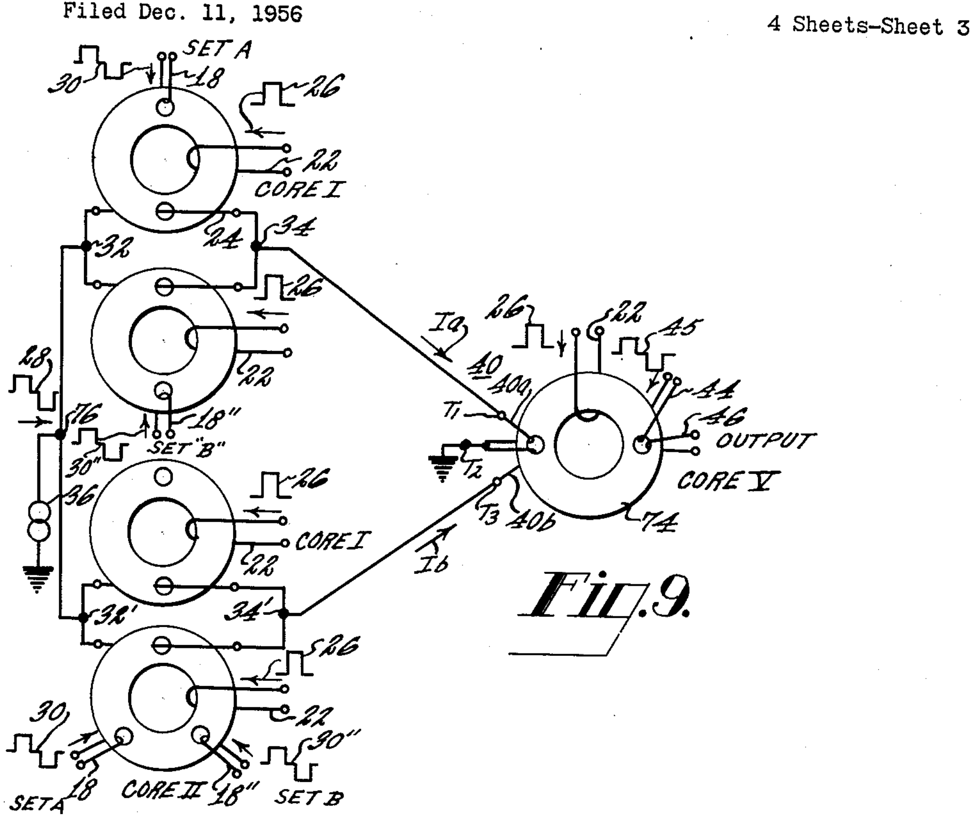
FIG. 9 is a schematic diagram of one form of "and" gate according to the invention.

An embodiment of a two-input "and" gate, according to the invention, is shown in FIG. 9. An "and" gate is a logic circuit which provides an output only when input signals are received on all its inputs, and provides no output when input signals are received on less than all its inputs. In FIG. 9, the core 74 is used as the output core and is designated as the core V. The output core V is arranged in similar manner to the output core III of the circuit of FIG. 5. The response of the output core V is controlled by two setting circuits each including a pair of cores 16. The common terminal 34 of the upper setting circuit is connected to the terminal $T_1$ of the setting winding 40 of the output core V. The common terminal 34′ of the lower setting circuit is connected to the terminal $T_3$ of the output core V setting winding 40. The common terminals 32 and 32′ of the setting circuits are connected together at a junction 76. The output of the drive source 36 is also connected to the junction 76. The core I of the lower setting circuit is used as a dummy core and remains in its blocked condition throughout the operation. The core II of the lower setting circuit has two separate setting apertures *a* and *a*′ for receiving setting signals corresponding to two input signals termed set "A" and set "B," respectively. The setting signals 30 and 30′, corresponding to the input signals A and B, respectively, are applied to the setting windings 18 and 18″ wound through the setting apertures *a* and *a*′, respectively, of the lower core II. The setting signals 30 and 30″ also are applied to the setting windings 18 and 18″ of the cores I and II, respectively, of the upper setting circuit. Initially, each of the cores of the "and" circuit is placed in its blocked condition by applying a blocking signal 26 to its blocking winding 22. The two setting signals 30 and 30″ may be applied simultaneously or in any order.

If only one of the two setting signals 30 or 30″ is applied, one of the cores I and II of the upper setting circuit, and the core II of the lower setting circuit, are changed to their set conditions. Accordingly, both setting circuits have one core in the blocked condition and one core in the set condition. A subsequent drive signal 28 then divides into equal portions at the junction 76 and the branch currents I*a* and I*b* are substantially equal to each other. Accordingly, the output core V remains in its initially blocked condition. Consequently, no output is produced in the output winding 46 of the output core V when sensing signals 45 are applied to the sensing winding 44. The changed core I or II of the upper setting circuit, and the changed core II of the lower setting circuit, are returned to the blocked condition by applying new blocking signals 22 to their respective blocking windings 26. Assume, now, that both the input signals A and B are present. Then both cores I and II of the upper setting circuit and the core II of the lower setting circuit are changed to their set conditions by the setting signals 18 and 18″. Now, a subsequent signal 28 divides into two unequal portions at the junction 76. The portion I*b* is larger than the portion I*a* because the core I of the bottom setting circuit is in its blocked condition. The larger portion I*b* changes the output core V to its set condition. A succeeding sensing signal 45 applied to the sensing winding 44 of the output core V then causes flux reversals in the output core V, thereby producing output signals in the output winding 46.

The cores I and II of the upper setting circuit, the core II of the lower setting circuit, and the output core V are each returned to its initial blocked condition by applying new blocking signals 26 to their respective blocking windings 22.

Figure 10:
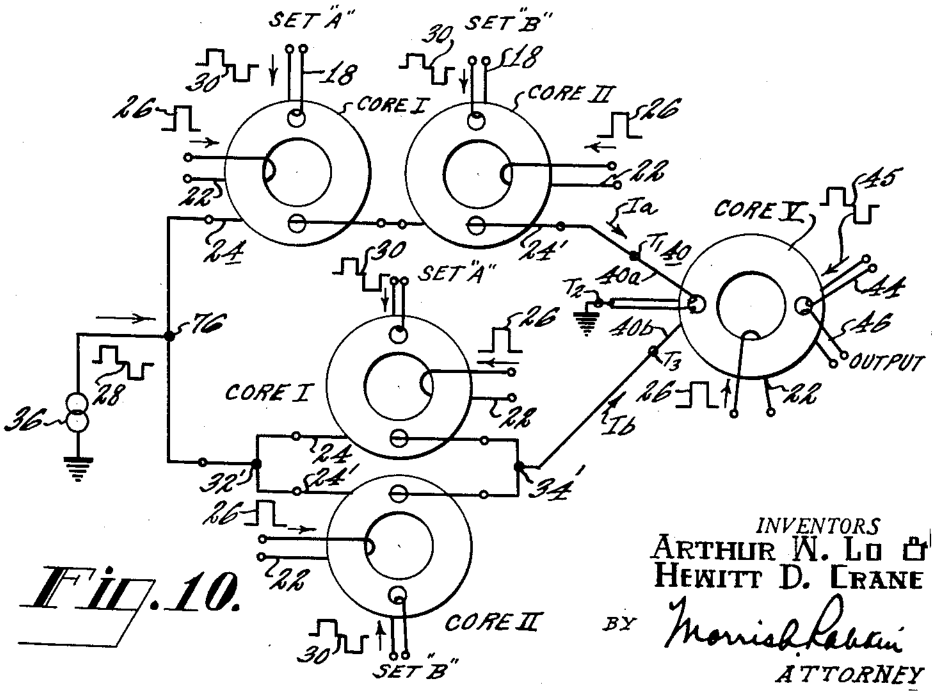
FIG. 10 is a schematic diagram of an "exclusive or" circuit according to the invention.

An embodiment of a logic circuit according to the invention, for performing an exclusive "or" function, is shown in FIG. 10. An exclusive "or" circuit is one which furnishes an output when one, and only one, of a number of inputs is present. No output is furnished when either two or more inputs are present, or when none of the inputs is present. The circuit of FIG. 10 is arranged similarly to the circuit of FIG. 9 except that the output windings 24 and 24′ of the upper setting circuit are connected in series with each other between the junction 76 and the end terminal $T_1$ of the setting winding 40 of the output core V. The cores I and II of the lower setting circuit respectively receive the one and the other of the two input signals.

In operation, when a first input signal Set "A" is present, a setting signal 30 is applied to the setting windings 18 of the cores I of both setting circuits; when a second input signal Set "B" is present, a setting signal 30 is applied to the setting windings 18 of the cores II of both setting circuits. Each of the cores is initially placed in its blocked condition as by applying blocking pulses 26 to the respective blocking windings 22. When neither of the input signals Set "A" or Set "B" is present, each of the cores of the circuit remains in its blocked condition. A subsequent drive signal 28 then divides into two equal branch currents I*a* and I*b* and the output core V remains in its blocked condition. A later sensing signal 45, applied to the sensing winding 44 of the output core V, then does not produce any flux change in the core V and substantially no output is produced in the output winding 46 of the core V. If both input signals Set "A" and Set "B" are present, each of the cores I and II of the setting circuits is changed to its set condition. Accordingly, a subsequent drive signal 28 again divides into two equal branch currents I*a* and I*b*, and the output core V remains in its blocked condition. In order to equalize the impedances offered to the drive signal 28 by the two setting circuits, the output windings 24 and 24′ of the upper setting circuit are each provided with "*n*" turns, and the output windings 24 and 24′ of the lower setting circuit are each provided with four "*n*" turns. Thus, the sum of the impedances offered to the drive signal 28 by the upper setting circuit is approximately equal to one-half the impedance offered to the drive signal by each core of the lower setting circuit so that the portions I*a* and I*b* of the drive signal are substantially equal when the cores I and II of each setting circuit are in their set conditions.

Assume, now, that only one of the input signals Set "A" or Set "B" is present, for example Set "A." In such case, setting signals 30 are applied to the setting windings 18 of the cores I of both setting circuits. Now, a subsequent drive signal 28 is applied and divides into two unequal portions at the junction 76 with the portion I*b* of the lower setting circuit exceeding the portion I*a* of the upper setting circuit. Most of the current I*b* flows through the output winding 24′ of the core II of the lower setting circuit because the core II is in its blocked condition. The larger portion I*b* of the drive signal 28 changes the output core V to its set condition. When only the input signal Set "B" is present, setting signals 30 are applied to the setting windings 18 of the cores II of both setting circuits. In such case, a subsequent drive signal 28 again divides into two unequal branch currents I*a* and I*b* at the junction 76, with the portion I*b* exceeding the portion I*a*, and thereby changing the output core V to its set condition. Most of the current I*b* flows through the output winding 24 of the core I of the lower setting circuit because the core I is in its blocked condition. A subsequent sensing signal 45, applied to the sensing winding 44, then produces flux reversals in the set output core V, thereby producing output signals in the output winding 46.

Accordingly, in the circuit of FIG. 10, an output is produced when, and only when, either, but not both, of two input signals are received. The input signals can be applied simultaneously or in any order.

Figures 11, 12, 13:
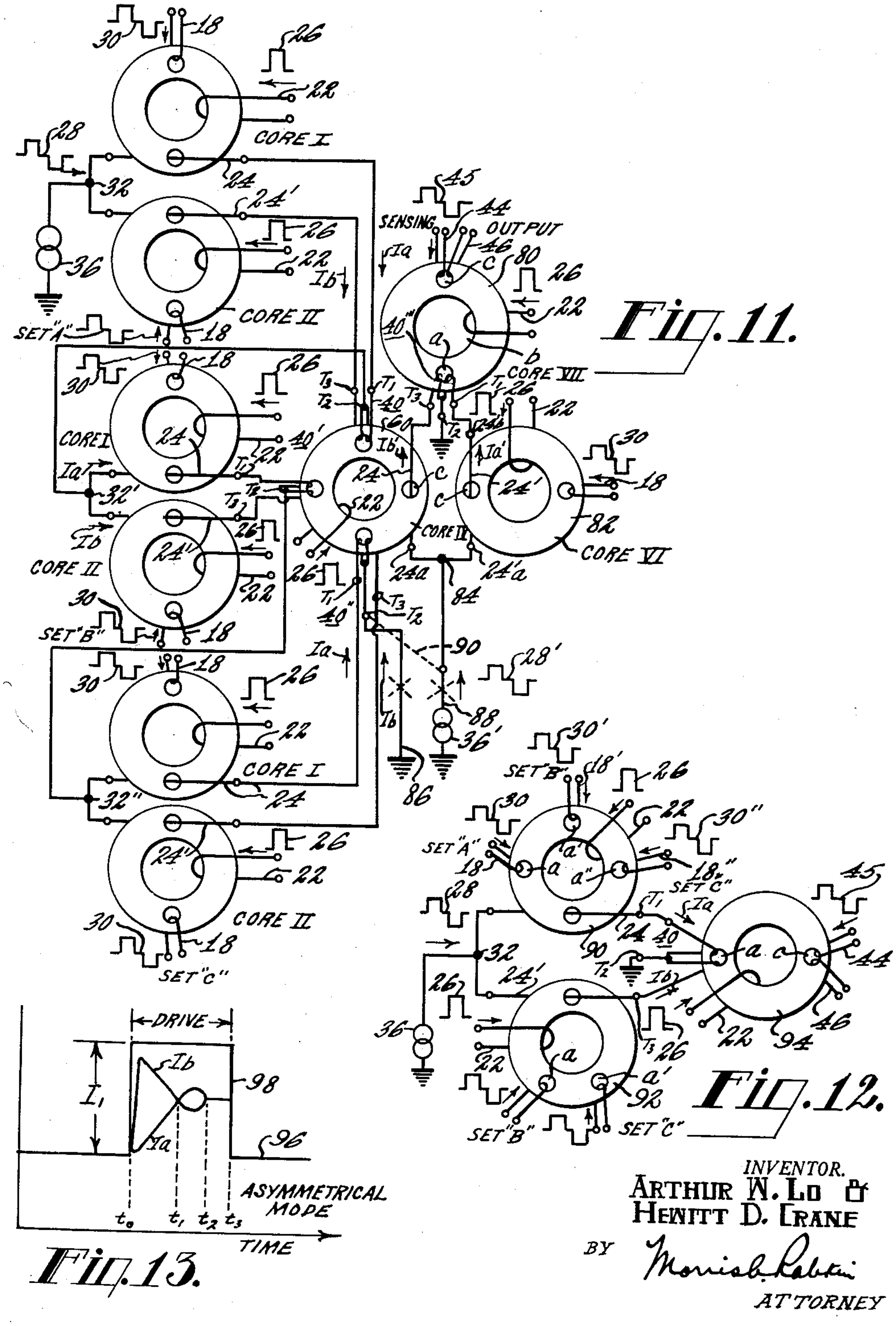
FIG. 11 is a schematic diagram of another form of "and" gate according to the invention.
FIG. 12 is a schematic diagram of an "inhibitory" gate according to the invention.
FIG. 13 is a timing diagram illustrating another mode of operation of the circuits of the invention.

An embodiment of a three-input "and" circuit, according to the invention, is shown in FIG. 11. The circuit of FIG. 11 is arranged similarly to the inclusive "or" circuit described in FIG. 7, except that the core IV of FIG. 7 is used in a fourth setting circuit to control an output core 80 designated as the core VII. The fourth setting circuit includes the core IV and a second core 82, designated as the core VI. An output winding 24, linked to the core IV through its output aperture *c*, has one end terminal 24*a* connected to a junction 84; and an output winding 24′, linked to the core VI through its output aperture *c*, has one end terminal 24′*a* connected to the junction 84. The other end terminal 24*b* of the output winding 24 of the core V is connected to one end terminal $T_3$ of a center-tapped setting winding 40‴ of the core VII. The other end terminal 24′*b* of the output winding 24′ of the core VI is connected to the other end terminal $T_1$ of the setting winding 40‴. The center terminal $T_2$ of the setting winding 40‴ is connected to ground. The setting winding of the output core VII is arranged such that current flow into the end terminal $T_3$ tends to change the core VII from its blocked to its set condition, and current flow into the end terminal $T_1$ tends to hold the output core VII in its blocked condition. The center terminal $T_2$ of the setting winding 40″ of the core IV of the fourth setting circuit may have its center terminal $T_2$ connected to ground via a conductor 86. A second drive source 36′ may have one output connected to the junction 84 of the fourth setting circuit via a conductor 88. The second drive source 36′ has another output connected to ground. If desired, the second drive source 36′ may be dispensed with, as described hereinafter. In such case, the center terminal $T_2$ of the setting winding 40″ of the core IV is connected directly to the junction 84 of the fourth setting circuit, and the conductors 86 and 88 are disconnected, as indicated, by the crosses in these conductors.

In operation, each of the cores I of the first three setting circuits are used as dummy cores and each is initially placed in its set condition as by applying a setting signal 30 to its setting winding 18. The core VI of the fourth setting circuit is also used as a dummy core and is initially placed in its set condition as by applying a setting signal 30 to its setting winding 18.

Assume, for the moment, that the "and" circuit has the two drive sources 36 and 36′ connected therein. In such case, the operating schedule may be: first, applying blocking signals 26 to the blocking windings 22 of the respective cores II of the first three setting circuits; the blocking winding 22 of the core IV of the fourth setting circuit, and the blocking winding 22 of the output core VII. Next, applying, or not applying, setting signals 30 of the setting windings 18 of the three cores II, depending upon whether or not the corresponding input signals are present or not. The three input signals are designated Set "A," Set "B" and Set "C," respectively. The Set "A" input signal controls the setting of the core II of the first setting circuit, the Set "B" input signal controls the setting of the core II of the second setting circuit, and the Set "C" input signal controls the setting of the core II of the third setting circuit. Next, applying a first drive signal 28 from the first drive source 36 to the junction 32 of the first setting circuit. Next, applying a second drive signal 28' to the junction 84 of the fourth setting circuit and, finally, applying sensing signals 45 to the sensing winding 44 of the output core VII, etc. An output is produced in the output winding 46 of the output core VII when, and only when, all three of the input signals Set "A," Set "B" and Set "C" have been received. The input signals may be applied simultaneously or in any order. When all three of the inputs are present, each of the cores II of the first three setting circuits are changed from their blocked to their set condition. In such case, the first drive signal 28 divides into two equal portions I*a* and I*b* in each of the first three setting circuits. Consequently, the core IV of the fourth setting circuit remains in its blocked condition. The second drive signal 28', however, divides into two unequal portions at the junction 84 of the fourth branch circuit. The portion I*b'*, flowing in the output winding 24 of the core IV, which is in its blocked condition, is larger than the portion I*a'* flowing in the output winding 24' of the dummy core VI which is in its set condition. Accordingly, the output core VII is changed from its blocked to its set condition by the net magnetizing force generated by the unequal portions I*b'* and I*a'* flowing in the setting winding 40'' of the output core VII. A subsequent sensing signal 45 then produces flux reversals in the output core VII, thereby producing an output signal in the output winding 46. The "and" circuit can be returned to its initial condition by applying blocking signals 26 to the respective blocking windings 22 of the core II, the core IV and the output core VII.

Assume, now, that one of the input signals, Set "A," Set "B," or Set "C" is absent. In such case, a setting signal 30 is not applied to the setting winding 18 of the core II responsive to the absent input signal, and that core II remains in its blocked condition. The drive signal 28 then divides into two unequal portions at the junction 32 of that one setting circuit, including the core II, that is in its blocked condition, with the portion I*b* of the drive signal exceeding the portion I*a*. The larger portion I*b* of the drive signal 28 flows through the connected winding 40 of that one setting circuit and changes the core IV of the fourth setting circuit from its blocked to its set condition. The drive signal 28 divides into two equal portions at the junction 32 of the other two setting circuits responsive to the other two input signals. Now, when the second drive signal 28' is applied, it divides into two equal portions I*a'* and I*b'* at the junction 84, and the output core VII remains in its blocked condition. Accordingly, no output signal is produced in the output winding 46 of the output core VII when subsequent sensing signals 45 are applied to the sensing winding 44. Similarly, when two of the three possible input signals are absent, the first drive signal 28 divides into unequal portions I*b* and I*a* at the junction 32 of the setting circuits responsive to these two input signals, and the core IV is changed to its set condition.

Accordingly, an output signal is produced in the "and" gate circuit of FIG. 11 when, and only when, all the input signals have been received.

When only the first drive source 28 is used for the circuit of FIG. 11, the drive signal 28 flows from the terminal $T_2$ of the setting winding 40'' of the core IV to the junction 84 of the fourth setting circuit. Then the drive signal 28 divides into two portions I*a'* and I*b'* in accordance with the response condition of the core IV, and then the drive signal 28 returns to the drive source 36 via the center terminal $T_2$ of the setting winding 40'' of the fourth setting circuit. Sufficient impedance is offered to the drive signal 28, by the core IV, when it is in the process of being changed to its set condition to cause the drive signal 28 to divide into two substantially equal portions at the junction 84. Exact equality of the two portions I*a'* and I*b'* is not required so long as their difference (I*b'*−I*a'*) does not produce sufficient magnetizing force to change the output core VII to its set condition. If all the input signals are present, however, the core IV remains in its blocked condition and most of the drive signal 28 then flows in the output winding 24 of the core IV, thereby changing the output core VII to its set condition.

A more generalized logic circuit is shown in FIG. 12. In the circuit of FIG. 12, an output is produced only when one of three input signals, Set "A," Set "B," or Set "C," is present, and when both of the other two of these inputs are absent. This circuit may be referred to as an "inhibitory" type circuit. When any of the three input signals, Set "A,"' Set "B," or Set "C," is present, a setting signal 30 is applied to a corresponding one of three setting windings 18, 18', or 18'', which is respectively linked through a different one of three setting apertures *a*, *a'* and *a''* of a first setting core 90. When either one of two of the input signals, for example Set "B" or Set "C," is present, a setting signal 30 is applied to a corresponding one of two setting windings 18 and 18' that are linked to a second setting core 92 through two setting apertures *a* and *a'*, respectively. The output windings 24 and 24' of the two setting cores 90 and 92 are connected in parallel with each other between a first junction 32 and the center terminal $T_2$ of the setting winding 40 of an output core 94. Each of the cores 90, 92 and 94 is initially placed in its blocked condition by applying a blocking signal 26 to its blocking winding 22. Assume, now, that the first input signal, Set "A," is present and that both of the other two input signals, Set "B" and Set "C" are absent. In such case, a setting signal 30 is applied to the setting winding 18 of the first setting core 90 to change the core 90 from its blocked to its set condition. The second setting core 92 remains in its blocked condition. Now, when a subsequent drive signal 28 is applied to the circuit by the drive source 36, it divides into two unequal portions I*b* and I*a* at the junction 32. The portion I*b* flowing in the output winding 24' of the second setting core 92 is larger than the portion I*a* flowing in the output winding 24' of the first setting core 90. Accordingly, the output core 94 is changed from its blocked to its set condition. When a subsequent sensing signal 45 is applied to the sensing winding 44 of the output core 94, an output is produced in the output winding 46.

Assume, now, that each of the cores is returned to its respective blocked condition. Also assume that the first input signal, Set "A," is present and that one or both of the second and third input signals, Set "B" and Set "C," are also present. In such case, a setting signal 30 is applied to one or more of the setting windings 18 of the first and second setting cores 90 and 92, changing each of these cores from its blocked to its set condition. Now, when a succeeding drive signal 28 is applied, it divides into two equal portions I*a* and I*b* at the junction 32, and the output core 94 remains in its blocked condition. Consequently, no output signal is produced in the output winding 46 when sensing signals 45 are applied to the sensing winding 44.

A timing diagram illustrating the second mode of operating any of the circuits, according to the present invention, is illustrated by the waveforms shown in FIG. 13. A drive signal having only one phase is used, as illustrated by the positive pulse 98 of the waveform 96. The amplitude $I_1$ of the drive signal 98 is made sufficiently large to generate a magnetizing force of sufficient intensity to "spuriously" unblock a transfluxor core along a path including both its setting and blocking apertures *a* and *b*. Such "spurious" unblocking is described in the aforementioned Rajchman and Lo article. Refer, for example, to the circuit of FIG. 12, and assume that the first setting core 90 is in its set condition and that the second setting core 92 and the output core 94 are in their blocked condition. Assume also that the drive source 36 is modified to supply the drive signals 98 shown in FIG. 13. Between the time $t_0$, when the drive pulse 98 is initiated, and a later time $t_1$, while the flux in the initially-set core 90 is changing, the portion I$b$ of the drive signal exceeds the portion I$a$. During this time, the output core 94 is changed to its set condition. At time $t_1$, the flux in the first setting core 90 is essentially completed. Between the time $t_1$, and a later time $t_2$, while the drive signal 98 is reversing flux in the initially blocked core 92, the portion I$a$ of the drive signal exceeds the portion I$b$. The resulting magnetizing force generated in the setting winding 40 of the output core 94 is in a direction to, and is of sufficient intensity, produce a flux reversal in the path immediately about the setting aperture $a$ of the output core 94. At a later time $t_2$, when the flux change in the second setting core 92 is essentially completed, the drive signal 98 divides into two equal portions I$a$ and I$b$ at the junction 32. At a later time $t_3$, the drive pulse 118 is terminated. In the second mode of operation, the division of the drive signal between the times $t_1$ and $t_2$ has a function similar to the negative phase 28$b$ of the drive signal 28 in the first mode of operation. When both the setting cores 90 and 92 are in their set conditions, the drive signal 98 divides into two portions I$a$ and I$b$ which are substantially equal to each other at any instant of time while the drive signal 98 is present. Accordingly, when both the setting cores are in the same condition, the output core 94 remains in its initially blocked condition.

The setting cores 90 and 92, and the output core 94, can be returned to their blocked conditions by applying blocking signals 26 to their blocking windings 22.

The second mode of operation is applicable to any of the logical circuits described herein. One advantage of using a drive signal of one phase is that, because of its relatively large amplitude, the flux in the setting cores is reversed relatively fast and, consequently, relatively fast operating speeds can be achieved.

The amplitude $I_1$ of the drive signal 98 can be as large as desired. Also, the setting operation, the blocking operation. and the drive operation all can be very fast without producing any undesired effects.

There have been described herein improved magnetic circuits useful in performing logic operations. In each of the illustrative circuits described herein, the various operations of blocking, setting, and driving can be arbitrarily fast. Relatively large-amplitude setting and blocking signals can be used in the various operations without producing undesired couplings or flux changes. An indefinite number of output signals can be obtained without destroying any of the stored information. The input signals can be applied simultaneously or in any order.

Two different modes of operation for any of the illustrative circuits have been described. In the first mode, drive signals having positive and negative phases are used. One of the phases of the drive signal is limited in amplitude to prevent "spurious" unblocking of a transfluxor core. In the second mode, the "spurious" unblocking of a transfluxor core is taken advantage of by using relatively large-amplitude drive signals of one phase. The driving operation can be carried out as fast as desired when using the second mode of operation.

Two or more of the illustrative circuits can be connected in cascade with each other, with the output of one circuit being used as the input of a succeeding circuit. If desired, a conventional magnetic core or other type amplifying stage can be used for amplifying the output of the one circuit before it is applied to the input of a succeeding circuit.

What is claimed is:

1. In a magnetic circuit, the combination comprising a plurality of separate magnetic cores each of substantially rectangular hysteresis loop material and each having two remanent states, means to establish said cores in desired ones of said remanent states, each of said cores having separate windings thereon, a first current path consisting of a connection having a linear characteristic connecting in series one of said windings on a first of said cores and one of said windings on a second of said cores, a second current path consisting of a linear connection connecting in series one of said windings on a third of said cores and another of said windings on said second core, said first and second current paths being connected in parallel with each other, and means for applying a drive current to said parallel paths, said drive current dividing in said paths in accordance with the remanent states established in said cores.

2. In a magnetic circuit, the combination comprising a plurality of separate magnetic cores each of substantially rectangular hysteresis loop material and each having two remanent states, means to establish said cores in desired ones of said remanent states, each of said cores having apertures and having windings threaded through said apertures, a first current path consisting of a connection having a linear characteristic connecting in series one of said windings on a first of said cores and one of said windings on a second of said cores, a second current path connected in parallel with said first path, said second path consisting of a linear connection connecting in series one of said windings on a third of said cores and another of said windings on said second core, said one and said other second core windings each being threaded through the same aperture of said second core, and means for applying a drive current to said parallel paths, said drive current dividing in said paths in accordance with the remanent states established in said cores.

3. In a magnetic circuit, the combination comprising a plurality of separate magnetic cores each of substantially rectangular hysteresis loop material, each of said cores having separate windings thereon, a first current path consisting of a connection having a linear characteristic connecting one of said windings on a first of said cores in parallel with one of said windings on a second of said cores and further connecting said one windings of said first and second cores in series with one of said windings on a third of said cores, and a second current path consisting of a linear connection connecting one of said windings on a fourth of said cores in parallel with one of said windings on a fifth of said cores and further connecting said one windings of said fourth and fifth cores in series with a different winding on said third core, said first and second current paths being connected in parallel with each other.

4. In a magnetic circuit, the combination comprising a plurality of separate magnetic cores each of substantially rectangular hysteresis loop material, each of said cores having separate windings thereon, a first current path consisting of a connection having a linear characteristic connecting in series one winding on a first, one winding on a second, and one winding on a third of said cores, and a second current path consisting of a linear connection connecting one winding on a fourth of said cores in parallel with one winding on a fifth of said cores and further connecting said one windings of said fourth and fifth cores in series with a different winding on said third core, said first and second current paths being connected in parallel with each other.

5. In a magnetic circuit, the combination comprising three magnetic cores of substantially rectangular hysteresis loop material each having two remanent states, each of said cores having apertures, a pair of current paths each having a linear characteristic, said current paths each linking one aperture in each of a different pair of said three cores and one of said cores being linked by both of said paths, two junction points, said current paths being connected in parallel with each other across said junction points, means for applying signals through other apertures of said cores to establish them in desired ones of said remanent states, and means for applying a signal across said current paths, said signal dividing in said paths in accordance with the remanent states established in said cores.

6. In a magnetic circuit, the combination comprising a plurality of magnetic cores of substantially rectangular hysteresis loop material, each of said cores having apertures and having windings threaded through said apertures, two junction points, a first current path connected across said junction points and comprising a connection having a linear characteristic connecting in series one of said windings on a first of said cores and one of said windings on a second of said cores, a second current path connected across said junction points and comprising a linear connection connecting in series one of said windings on a third of said cores and another of said windings on said second core, and means for controlling current flow in said paths comprising means for selectively applying signals to others of said windings threaded through other apertures of said first and second cores.

7. In a magnetic circuit, the combination comprising three magnetic cores of substantially rectangular hysteresis loop material each having at least two remanent states, each of said cores having apertures, first and second windings having terminals, said first and second windings being respectively threaded through first apertures in said first and second cores, a third winding having terminals, threaded through one aperture of the third of said cores, means connecting one terminal of each of said first and second windings to respective terminals of said third winding, first and second junctions, said first and second windings being connected at their other terminals to said first junction, and another of said third winding terminals being connected to said second junction, means for applying signals through other apertures of said first and second cores to establish said first and second cores in desired ones of said remanent states, and means for applying a signal across said windings, said signal dividing in said first and second windings in accordance with the remanent states established in said cores.

8. In a magnetic circuit, the combination comprising three magnetic cores of substantially rectangular hysteresis loop material, each of said cores having apertures and each of said cores having different response conditions, first and second windings respectively linked to apertures of first and second ones of said cores, a third winding linked to one aperture of a third of said cores, first and second junctions, a first series circuit comprising in series said first winding and one part of said third winding, a second series circuit comprising in series said second winding and the other part of said third winding, said series circuits being connected across said junctions, means for applying signals through other apertures of said first and second cores to establish said first and second cores in desired response conditions, and means for applying a signal across said junction points, said signal dividing in said series circuits in accordance with the response conditions of said first and second cores.

9. In a magnetic circuit, the combination as claimed in claim 8, wherein said signal comprises a first phase of one polarity and a second phase of the opposite polarity, said phases each producing a different flux change in said third core when said first and second cores are in unlike response conditions, and neither of said phases producing a flux change in said third core when said first and second cores are in like response conditions.

10. In a magnetic circuit, the combination as claimed in claim 8, wherein said signal comprises a pulse of one polarity, said pulse producing successive flux changes in said third core when said first and second cores are in unlike response conditions, and said pulse producing substantially no flux change in said third core when said first and second cores are in like response conditions.

11. In a magnetic system, the combination comprising a plurality of separate magnetic circuits, each of said circuits having: (1) a plurality of separate magnetic cores each of substantially rectangular hysteresis loop material and each having separate windings thereon; (2) a first current path consisting of a connection having a linear characteristic connecting one winding on a first of said cores in series with one winding on a second of said cores; (3) a second current path consisting of a connection having a linear characteristic connecting one winding of a third of said cores in series with another winding of said second core, and (4) first and second junctions, said first and second current paths being connected in parallel with each other across said junction, and said circuits being interconnected by connecting the second junction of one of said circuits to the first junction of a successive one of said circuits.

12. In a magnetic system, the combination as claimed in claim 11, wherein said second core is common to all of said magnetic circuits.

13. In a magnetic system, the combination as claimed in claim 11, and further including fourth and fifth cores of substantially rectangular hysteresis loop material having separate windings thereon, third and fourth junctions, another current path consisting of a connection having a linear characteristic connecting one winding of said fourth core in series with one winding of said fifth core, and still another current path consisting of a connection having a linear characteristic connecting still another winding of said second core in series with another winding of said fifth core, said other current paths being connected in parallel with each other across said third and fourth junctions.

14. In a magnetic circuit, the combination as claimed in claim 13, and further including a connection between the second junction of the last one of said circuits and said third junction.

15. A magnetic system as claimed in claim 13, and further including means for applying alternating polarity signals across the said first junction of the first one of said circuits and the said second junction of the last one of said circuits, and means for applying other alternating polarity signals across said third and fourth junctions.

16. In a magnetic system, the combination as claimed in claim 11, wherein said second core is common to all of said magnetic circuits, and wherein said separate windings on said second core include an interrogation winding for receiving alternating polarity signals, and an output winding responsive to flux changes produced in said second core by said alternating polarity signals.

17. In a magnetic circuit, the combination comprising three magnetic cores of substantially rectangular hysteresis loop material, each of said cores having three or more apertures therein; namely, setting, blocking, and output apertures, an output winding linking the output aperture of each of said cores, a separate setting winding linking each setting aperture of each of said cores, a separate blocking winding linking each blocking aperture of each of said cores, an interrogation winding linking the output aperture of a third of said cores, said setting winding of said third core having three terminals, means connecting respective end terminals of said first and second core output windings to two of said terminals of said third core setting winding, a junction, means connecting the other end terminals of said first and second core output windings to said junction, and means for applying alternating polarity signals across said junction and the third terminal of said third core setting winding.

18. In a magnetic circuit, the combination comprising three magnetic cores of substantially rectangular hysteresis loop material, each of said cores having three or more separate apertures therein; namely, setting, blocking, and output apertures, an output winding linking the output aperture of each of said cores, a separate setting winding linking each setting aperture of each of said cores, a separate blocking winding linking each blocking aperture of each of said cores, an interrogation winding linking the output aperture of a third of said cores, said setting winding of said third core having three terminals, means connecting respective end terminals of said first and second core output windings to two of said terminals of said third core setting winding, a junction, the other end terminals of said first and second core output windings being connected to said junction, and means for applying a unidirectional signal across said junction and said third terminal of said third core setting winding.

19. In a magnetic system, the combination comprising a plurality of pairs of magnetic cores each of substantially rectangular hysteresis loop material and each having a plurality of apertures therein; namely, setting, blocking, and output apertures, another core of substantially rectangular hysteresis loop magnetic material having a plurality of apertures therein; namely, a plurality of setting apertures, a blocking, and an output aperture, a different output winding linked to each of said output apertures, a different blocking winding linked to each of said blocking apertures, and a different setting winding linked to each of said setting apertures, said setting windings of said other core each having two end terminals and a center terminal, one end terminal of the output windings of each different pair of said cores being connected respectively to the end terminals of a different setting winding of said other core, a plurality of junctions including a first junction, the other end terminal of both the output windings of said pairs of cores being connected to a different one of said junctions, the third terminal of each different setting winding of said other core being connected to a different one of said junctions except for said first junction, and means for applying a unidirectional signal across said first junction and the third terminal of the remaining one of said setting windings of said other core.

20. A magnetic system comprising three magnetic cores each of substantially rectangular hysteresis loop material and each having a plurality of apertures therein; namely, setting, blocking, and output apertures, the first of said cores having three separate setting apertures, the second of said cores having two separate setting apertures, and the third of said cores having a single setting aperture, a different setting winding threaded through each separate setting aperture, a different output winding threaded through each output aperture, and a different blocking winding threaded through each blocking aperture, said setting winding of said third core having three terminals, respective ones of the end terminals of said first and second core output windings being connected to two of said terminals of said third core setting winding, first and second junctions, the other end terminals of said first and second core output windings being connected to said first junction, the third terminal of said third core setting winding being connected to said second junction, corresponding signals being applied to one of the setting windings of both said first and second cores, other corresponding signals being applied to another of the said setting windings of both said first and second cores, and still another signal being applied to said third setting winding of said first core, and means for applying alternating polarity signals across said first and second junctions, said alternating signals dividing substantially equally in the said output windings of said first and second cores except when said corresponding signals are not applied and when said still other signal is applied.

21. In a magnetic circuit, the combination comprising a plurality of magnetic cores of substantially rectangular hysteresis loop material, each of said cores having at least two remanent states and each of said cores having a plurality of apertures therein, each of said cores having separate windings linked through said apertures, a plurality of current paths, each of said current paths consisting of a connection having a linear characteristic connecting in series at least one of said windings on at least one of said cores to another winding on another of said cores, means connecting said current paths in pairs with the two current paths of a pair being connected in parallel with each other, means for applying signals to said cores to establish them in desired ones of said remanent states, and means for applying a signal across said pair of current paths, said signal dividing in said paths in accordance with the remanent states of said cores.

22. In a magnetic circuit, the combination as recited in claim 21, said circuit having a plurality of pairs of said current paths and successive pairs of said current paths being connected in series with each other.

23. In a magnetic circuit, the combination as recited in claim 21 each current path including separate windings on a different pair of said cores connected to said other winding on said different core.

24. In a magnetic circuit, the combination as recited in claim 21, each of said current paths including a different pair of said cores, and one of said cores being common to all said current paths.

References Cited in the file of this patent

UNITED STATES PATENTS

| | | |
|---|---|---|
| 2,769,122 | Moreines | Oct. 30, 1956 |
| 2,814,737 | Sunderlin | Nov. 26, 1957 |
| 2,861,259 | Meyerhoff | Nov. 18, 1958 |
| 2,884,622 | Rajchman | Apr. 28, 1959 |

OTHER REFERENCES

Magnetic Core Circuits for Digital Data Processing Systems, by D. Loev et al., Proceedings of the I.R.E., February 1956, vol. 44, issue 2, pp. 154–162.